US 7,389,759 B2

(12) United States Patent
McCullagh

(10) Patent No.: US 7,389,759 B2
(45) Date of Patent: Jun. 24, 2008

(54) INTERNAL-COMBUSTION ENGINE

(75) Inventor: David Gerard McCullagh, Warrington (GB)

(73) Assignee: MAN B & W Diesel, Ltd., Chesire (GB)

( * ) Notice: Subject to any disclaimer, the term of this patent is extended or adjusted under 35 U.S.C. 154(b) by 245 days.

(21) Appl. No.: 10/516,003

(22) PCT Filed: Jun. 2, 2003

(86) PCT No.: PCT/GB03/02406

§ 371 (c)(1),
(2), (4) Date: Jun. 10, 2005

(87) PCT Pub. No.: WO03/102398

PCT Pub. Date: Dec. 11, 2003

(65) Prior Publication Data

US 2005/0235942 A1 Oct. 27, 2005

(30) Foreign Application Priority Data

May 31, 2002 (GB) ................................ 0212733.0

(51) Int. Cl.
*F02M 35/10* (2006.01)
*F01P 1/06* (2006.01)
(52) U.S. Cl. .............................. 123/193.5; 123/184.34; 123/41.31; 123/184.31
(58) Field of Classification Search .............. 123/193.5, 123/562, 184.34, 41.31, 184.61, 184.31, 123/184.21
See application file for complete search history.

(56) References Cited

U.S. PATENT DOCUMENTS 3,809,032 A 5/1974 Morris .................... 123/52 M
4,267,812 A 5/1981 Aula et al. ................... 123/570
4,458,491 A 7/1984 Deutschmann ............... 60/612
5,183,134 A * 2/1993 Kuc .......................... 184/6.16
5,363,651 A * 11/1994 Knight ........................ 60/595

(Continued)

FOREIGN PATENT DOCUMENTS

DE 44 33 285 A 3/1996

(Continued)

OTHER PUBLICATIONS

Koehler: "Der Neue Man B&W Dieselmotor 48/60B"; vol. 54, No. 7, Jul. 2002; pp. 40-46; XP001126094.

(Continued)

*Primary Examiner*—Stephen K. Cronin
*Assistant Examiner*—Hyder Ali
(74) *Attorney, Agent, or Firm*—Banner & Witcoff, Ltd.

(57) ABSTRACT

An internal-combustion engine has cylinders 21 arranged preferably in a V-formation with corresponding cylinder heads (27) including connectors for the supply and discharge of fluids. The cylinders are mounted in a crankcase (41) and are supplied with air for combustion by a cast air manifold (51) running the length of the engine, the air manifold being located adjacent to the row of cylinders, preferably in the V. To reduce the amount of pipework the manifold has shaped connectors for at least one of the fluids, in particular the air intake (33) and the water coolant (55), these connectors connecting directly to the relevant connectors on the cylinder head and being pressed against them by the pressure in the manifold.

14 Claims, 4 Drawing Sheets

U.S. PATENT DOCUMENTS

| | | | |
|---|---|---|---|
| 5,481,461 A * | 1/1996 | Miyamoto et al. | 701/99 |
| 5,515,834 A * | 5/1996 | Hoshino et al. | 123/674 |
| 5,660,154 A * | 8/1997 | Fields | 123/184.42 |
| 5,816,218 A * | 10/1998 | Motose | 123/406.18 |
| 6,032,634 A | 3/2000 | Minegishi et al. | 123/184.55 |
| 6,553,980 B1 * | 4/2003 | Nally et al. | 123/585 |
| 7,011,071 B1 * | 3/2006 | Decuir, Jr. | 123/317 |
| 7,059,289 B2 * | 6/2006 | Cunningham et al. | 123/184.47 |
| 7,178,504 B2 * | 2/2007 | Huhn et al. | 123/336 |
| 2002/0053331 A1 | 5/2002 | Yamaguchi | |
| 2004/0065308 A1 * | 4/2004 | Bryant | 123/562 |
| 2004/0065309 A1 * | 4/2004 | Verschoor | 123/568.11 |
| 2005/0235942 A1 * | 10/2005 | McCullagh | 123/184.34 |
| 2006/0105645 A1 * | 5/2006 | Lawson | 440/38 |
| 2006/0112928 A1 * | 6/2006 | Coleman et al. | 123/305 |

FOREIGN PATENT DOCUMENTS

| | | |
|---|---|---|
| EP | 0 162 272 | 4/1985 |
| EP | 0 644 326 A1 | 9/1994 |
| EP | 1 069 301 A2 | 7/2000 |
| EP | 1069301 A2 * | 1/2001 |
| GB | 2 174 454 A | 11/1986 |
| JP | 10-30445 | 2/1998 |
| JP | 10 122071 A | 5/1998 |
| WO | WO 94 13948 A | 6/1994 |

OTHER PUBLICATIONS

Ecker et al: :Nie Neue V12-und V16-Motorenbaureihe der Anglo Belgian Corporation; vol. 62, No. 7/8; Jul. 2001, pp. 550-557; XP001053852.

Patent Abstracts of Japan; vol. 1998, No. 10, Aug. 31, 1009.

* cited by examiner

INTERNAL-COMBUSTION ENGINE

This application is a U.S. National Stage application of co-pending PCT application PCT/GB03/02406 filed Jun. 2, 2003, which claims the priority of United Kingdom Patent Application No. 0212733.0, filed May 31, 2002. These applications are incorporated herein by reference in there entireties.

BACKGROUND

The present invention relates to internal-combustion engines, in particular large engines such as are used in fast boats such as ferries or generally for industrial power generation.

Manufacturers of engines are of course always trying to increase the specific power output of their engines. One way of doing this is by reducing the weight of the engine. Another important characteristic is the ease of maintenance of such engines, which is partly dependent upon the ease of access to the internal components. Also, of course, reducing the cost of manufacture is a constant requirement. The present invention aims to make improvements in all these areas.

For background on the layout of engines one can consult the following documents. U.S. Pat. No. 3,809,032 (G O Morris) describes a manifold for with separate passages for a multiple-barrel carburettor. U.S. Pat. No. 4,267,812 (Ford) shows a manifold system providing an integral mounting of an EGR cooler/carburettor. U.S. Pat. No. 4,458,491 (MTU) has an exhaust manifold system within the V of a V-engine. U.S. Pat. No. 6,032,634 (Hitachi) shows a multi-part engine air manifold system located on the engine, where two design options are provided for an optimised air charging system as well as providing cooling for the engine control unit. The manifold system includes a longitudinal partition wall and mounts other engine components such as the injectors. JP 10-030445A (Nissan) shows an intake manifold with an integral supercharger, mounted on top of the engine. EP 0162272 A1 (KHD) shows an enclosed assembly containing lubricant and fuel pipes. EP 0644326 A1 (Hitachi) is an air duct with integral air filter/throttle valve and a plurality of suction pipes. Described in EP 1069301 A2 (DDC) is a wedge-shaped cylinder head with integral air manifold mounted on top of and spanning the cylinder heads. Finally GB 2174454 A (Rover) shows an air induction system with variable plenum length. The design allows ease of manufacturing by plastic mouldings and metal pressing.

SUMMARY OF THE INVENTION

According to the invention there is provided an internal-combustion engine having cylinders arranged in a row with corresponding cylinder heads including connectors for the supply and discharge of fluids, the cylinders being mounted in a casing and being supplied with air for combustion by an air manifold running the length of the engine, in which the air manifold is locked adjacent to the row of cylinders, and has shaped connectors for at least one of the fluids, these connectors connecting directly to the relevant connectors on the cylinder head.

This arrangement does away with at least some of the piping between the air manifold and the cylinders that is a feature of prior-art engines. The connecting parts of air manifold and cylinder head abut each other directly, but a good seal can nevertheless be achieved because (in contrast to the engines described above) the pressure in the air manifold during operation of the engine presses outwards and seals the connection.

For pressure within the air manifold to improve the seal of the connectors on the manifold abutting against the cylinder heads there must be a support opposite the cylinders against which the air manifold can bear. For an in-line engine a special support can be designed, but the invention is particularly advantageous for V-engines because the manifold can simply be located within the V, between the rows of cylinders, in use bearing outwardly against them on both sides. Preferably it rests directly on the crankcase, and the connectors are designed to have substantially vertical planes of abutment.

The fluid or fluids in question can be combustion fluids, such as the air directed towards the inlet valves in the cylinder head, or heat-exchange fluids, in particular the water used for cooling the cylinders. Advantageously both such possibilities are made use of, so that the air manifold has no external pipes along its length (though it will generally have pipes at the end for supply and discharge).

It is possible to achieve further integration if further channels, not necessarily communicating directly with the cylinder heads and being for instance for oil and/or water, are integrated into the manifold, preferably on its underside, i.e. adjacent to the casing, in other words the crankcase. Moreover, in the part between the rows of cylinders and directly under the air manifold the crankcase may itself contain passages for water, one over the other, the upper or outer one of which is sealed directly by the air manifold, i.e. the wall of the manifold also forms part of the wall of the passage. This reduces the number of parts of the engine. Furthermore the intercooler for a turbocharger arrangement can be mounted directly on top of the air manifold. This does away with the support brackets that would otherwise be needed, saving weight and space. The air manifold is preferably cast, so as to be able to achieve the necessary shape, and may for instance be of aluminium. With the intercooler supported along its entire length on the manifold the strength of aluminium is entirely adequate.

For a better understanding of the invention an embodiment will now be described with reference to the accompanying drawings, in which.

Figure 1:
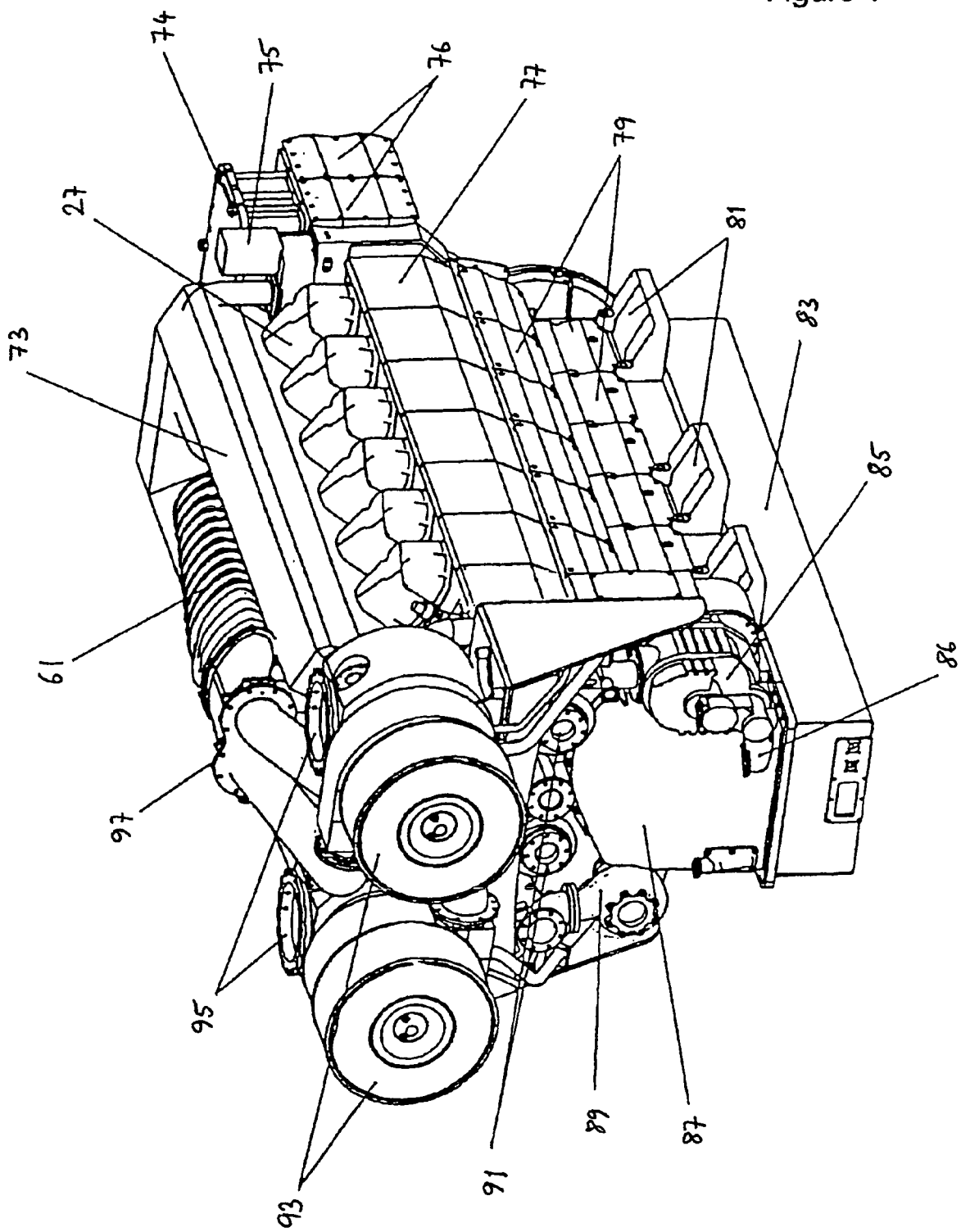
FIG. 1 shows a perspective view of a complete engine, representing an embodiment of the invention.

FIG. 1 shows a V12 engine which can be used, for instance, in fast cross-channel ferries. The cylinder head 27 on one side can be seen, as can the intercooler 61 on top of the engine and next to it on either side the exhaust heat shields 73. All the drives are at one end of the engine, and in the Figure the lubricating oil pump 85, sea water pump 89 and fresh water pumps 91 can be seen. Also visible is a damper 87 and the twin air filters 93 leading into the turbochargers which in turn lead via twin emergency shut-off valves 97 into the intercooler 61.

Figure 2:
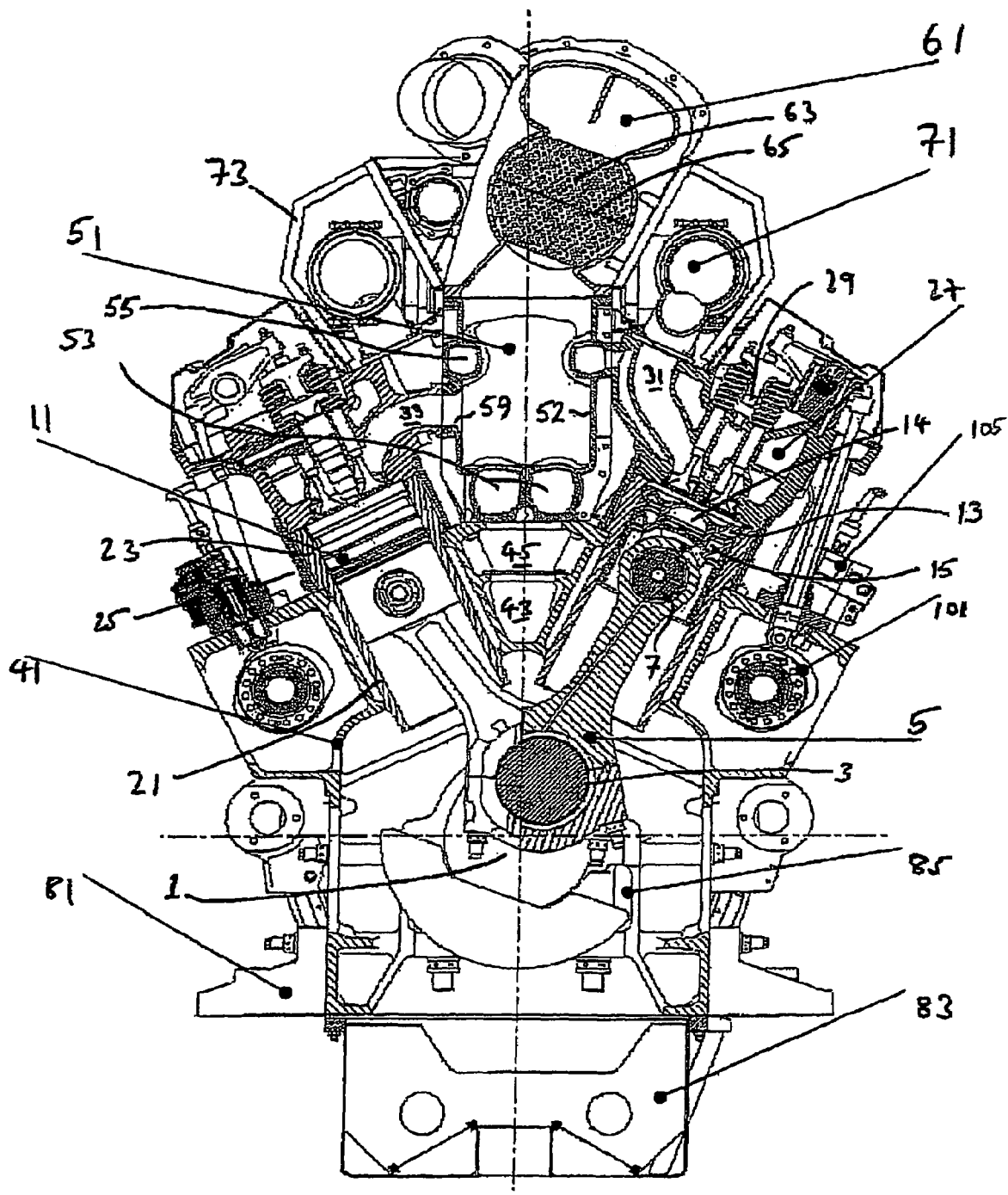
FIG. 2 shows a cross-section through the engine perpendicular to the axis.

FIG. 2 shows a cross-section though this engine. The engine is of a modular design and can be produced in varying configurations—currently as a twelve-, sixteen- or twenty-cylinder engine—with a minimal stock of parts such as air manifold, cylinder head. The section is taken through a crank 3 of the crank shaft 1 to which is connected a two-piece dowelled angle split connecting rod 5 leading to the gudgeon pin 7 at the small end. The gudgeon pin is connected in the usual way to a piston 11 which in its crown 13 has a central chamber 14 surrounded by an annular chamber 15. To form the chambers the piston is made in two parts split by a plane perpendicular to its axis by a proprietary process.

The piston 11 slides in cylinders 21 having at their upper ends, i.e. at the ends away from the crank shaft, a thicker portion 23 surrounded by a sleeve or water jacket 25 defining the chamber for cooling of the cylinder. On top of each cylinder is a cast cylinder head 27 with two pairs of valves 29 mounted in the usual way. The cylinder head is cast in iron and has an exhaust outlet 31 and an air inlet 33. The cylinders are mounted in a V formation in a cast crankcase 41, being sealed to it approximately at the bottom end of their thicker portions 23. The crankcase contains at least one passage, here two cast passages 43 and 45, for water running axially to the engine, located generally in the V between the lower ends of the cylinder liners 21. The upper passage 45 is the hot feed to the cylinder heads, and the lower passage 43 is the cold return.

An air manifold 51, likewise made of cast aluminium and having a generally rectangular section with side-walls 52, runs the length of the engine and is mounted approximately between the cylinder heads 27 of the two banks of cylinders. The manifold 51 has a central passage running along its length and off this passage along each side in the sidewalls 52 has air terminals or connectors 59 that abut the ends of the air passages 33 of the cylinder heads. The plane of their abutment is substantially vertical, i.e. perpendicular to the axis of the V. Likewise the manifold 51 has, near the top of the sidewalls, integral cast passages 55 for hot water that communicate with a chamber surrounding the exhaust passages 31 in the cylinder heads. In use the pressure in the manifold pushes the sidewalls 52, with the connecting terminals, outwards against the corresponding terminals on the cylinder heads, reinforcing the sealing effect.

The air manifold 51 also has twin axial water and oil passages 53 in its bottom section, the lower walls of which act to seal the upper water passage 45 in the crank casing. The water passage in the air manifold supplies cold water to a second intercooler, if present.

On top of the air manifold 51 is mounted the intercooler 61 which is a two-stage intercooler with integral air intake passage, surrounded by a single casing which has a waist so that it forms a figure of eight in section, the upper part being the air passage and the lower part enclosing the heat exchanger pipes 63. A line can also be seen which notionally splits the intercooler into two stages: the pipes above this line are connected to the hot (c. 80° C.) water from the passages 55, and the pipes below are connected to the cold (c. 40° C.) supply. The air spreads axially along the air passage and then down between the pipes and into the manifold. Next to the intercooler on either side are the exhaust manifolds 71 connected to the exhaust passages 31 of the cylinder heads, again directly. The exhaust manifolds are protected by covers 73, which as can be seen are in two parts.

FIGS. 1 and 2 also shows the cam shafts 101, the fuel pump 105, the sump 83, twin bearing caps 85 and cast mounting feet 81 for mounting the engine in a frame, such as a ship's frame, the lubricating oil cooler 74, an intercooler water diverting valve 57, a duplex lubricating oil filter 76, a fuel pump and tappet cover 77, crankcase doors 79, a lubricating oil pump 84 and a lubricating oil filler 86. For a twelve-cylinder ferry engine the bore is 280 mm, the stroke is 330 mm and the power output may be about 5.4 MW at a speed of about 1000 r/min. However the invention is not limited to ships' engines.

Figure 3:
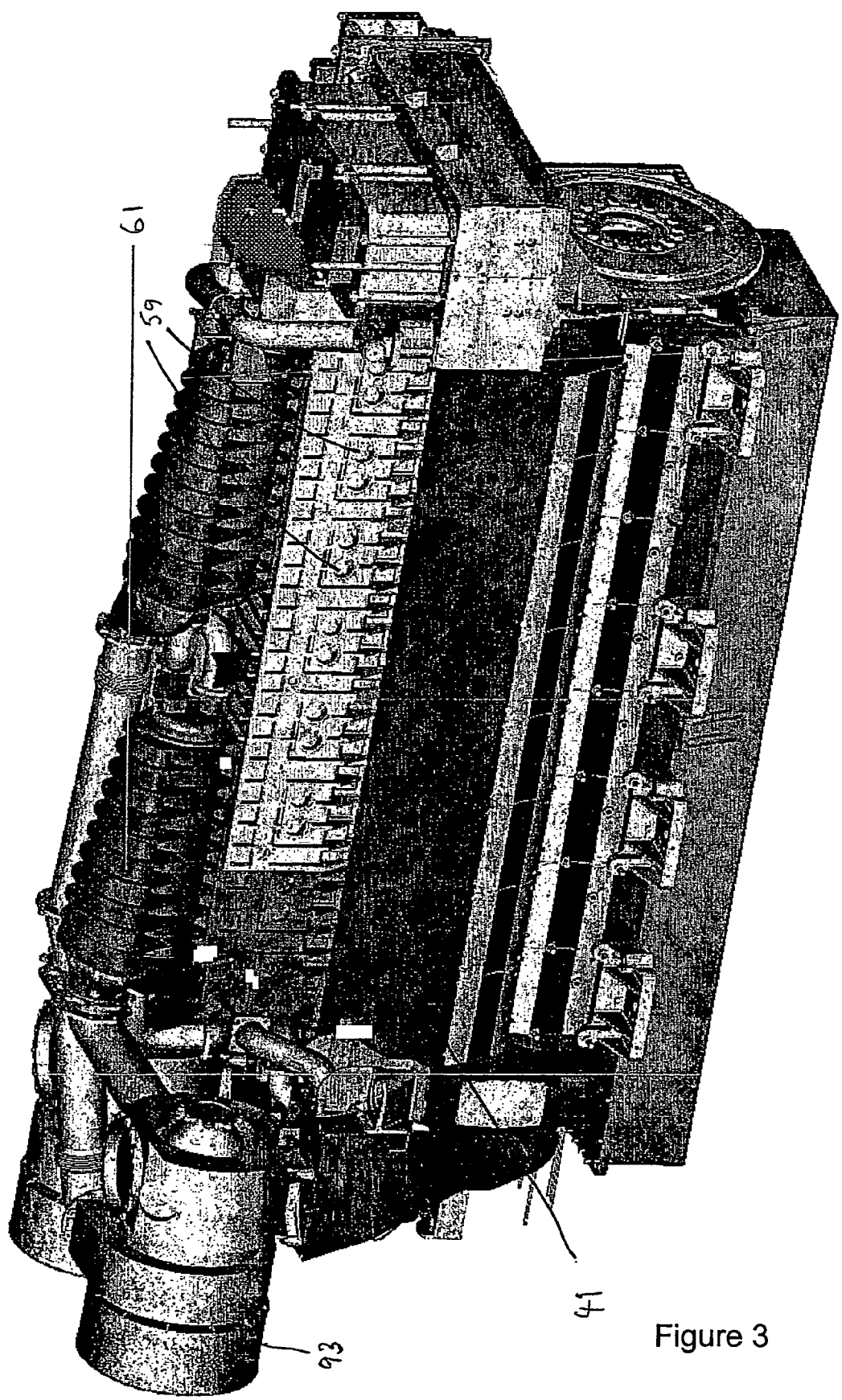
FIG. 3 shows a perspective view of the engine with the cylinder heads removed showing the air manifold.
Figure 4:
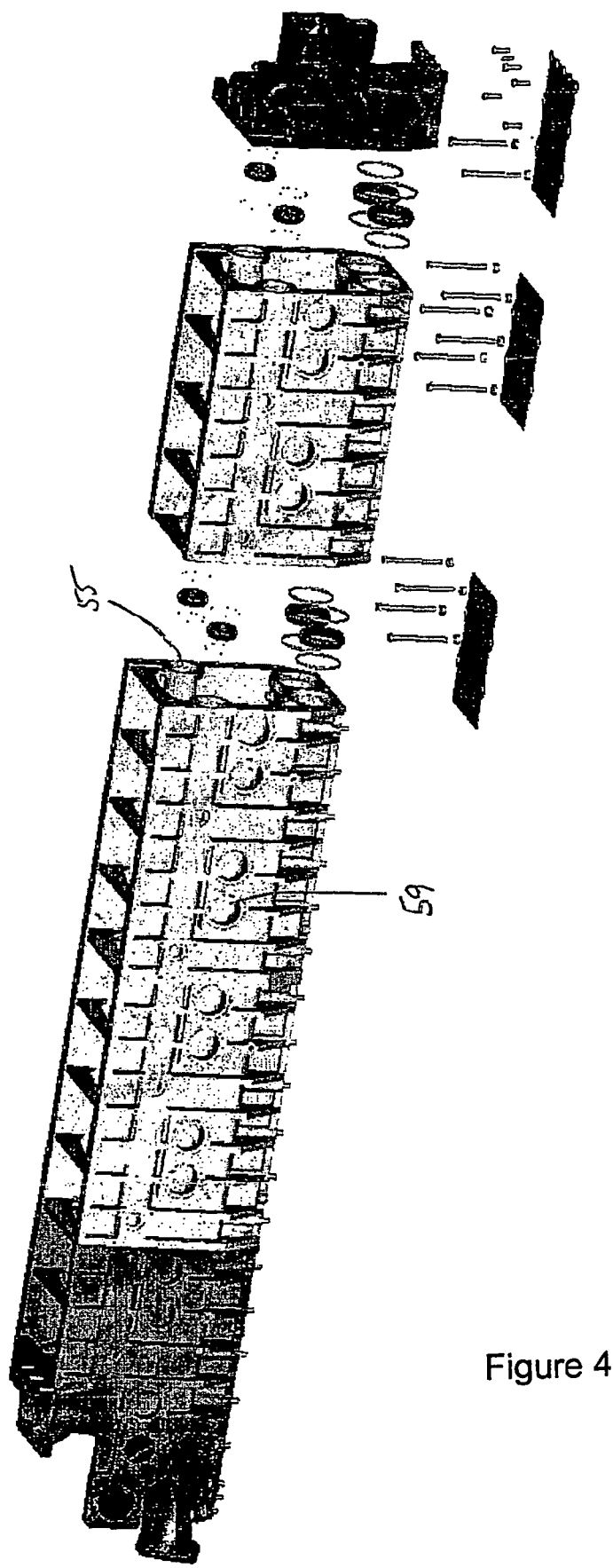
FIG. 4 shows the air manifold itself.

FIG. 3 shows a 16-cylinder version of the engine in perspective, with the cylinder heads 27 removed so that the air manifold box 51 is visible. The cast air connections 59, a pair for each cylinder, are visible. In the 16-cylinder version (as for the 20-cylinder) two intercoolers 61 are used, the cold water supply to the second being by way of one of the lower passages 53 in the manifold. The manifold 51 is shown on its own in FIG. 4, the seals between sections also being shown in a partially exploded view that reveals the hot-water passages 55. These Figures also show the modular nature of the engine and manifold, the cross-section of the manifold being essentially uniform, with passages running only axially within it along its length.

The invention claimed is:

1. An internal-combustion engine having cylinders arranged in two rows in a V-formation with corresponding cylinder heads including connectors for the supply and discharge of fluids, the cylinders being mounted in a casing and being supplied with air for combustion by an air manifold running the length of the engine, in which the air manifold is located within the V of the engine, between the row of cylinders, and has sidewalls with shaped connectors for at least one of the fluids, the shaped connectors of the sidewalls connecting directly to the connectors of the cylinder heads along a parting plane that is substantially vertical, and in use the shaped connectors of the sidewalls being pressed against the connectors of the cylinder heads by the pressure in the manifold.

2. An engine according to claim 1, in which the fluid or fluids include combustion fluids, such as the air directed towards the inlet valves in the cylinder head, or heat-exchange fluids, in particular water used for cooling the cylinders, or both.

3. An engine according to claim 1, in which the air manifold has no external pipes along its length, and contains passages for the fluids that run essentially along its entire length.

4. An engine according to claim 3, in which further channels, not communicating directly with the cylinder heads and being for instance for oil and/or water, are integrated into the air manifold.

5. An engine according to claim 1, in which, in the part adjacent to the row of cylinders and directly under the air manifold, the engine crankcase itself contains passages for water, the upper one of which is sealed directly by the air manifold.

6. An engine according to claim 1, further comprising an intercooler for a turbocharger arrangement, mounted directly on top of the air manifold.

7. An engine according to claim 1, in which the air manifold is cast, for instance of aluminum, and has a generally rectangular cross-section.

8. An engine according to claim 1, in which the air manifold is of modular design, being adapted to be fitted to further such manifolds, end to end.

9. A water craft having an engine according to claim 1.

10. An internal-combustion engine having cylinders arranged in two rows, in a V-formation, with corresponding cylinder heads including connectors for the supply and discharge of fluids, the cylinders being mounted in a casing and being supplied with air for combustion by an air manifold running the length of the engine, in which the air manifold is located within the V of the engine, between the rows of cylinders, and has shaped connectors for at least one of the fluids, these connectors connecting directly to the relevant connectors on the cylinder head, and further channels, not communicating directly with the cylinder heads and being for instance for oil and/or water, integrated into the lower part of the air manifold and running along its length.

11. An engine according to claim 10, wherein in which the engine is a V-engine and the manifold with further channels is located within the V.

12. An internal-combustion engine having cylinders arranged in two rows in a V-format with corresponding cylinder heads including connectors for the supply and discharge of fluids, the cylinders being mounted in a casing; and an air manifold running the length of the engine, the cylinders being supplied with air for combustion by the air manifold; in which the air manifold is adjacent to and located within the V, between the rows of cylinders, and has sidewalls with shaped connectors for at least one of the fluids, the shaped connectors of the sidewalls connecting directly to the connectors of the cylinder heads along a parting plane that is substantially vertical, and in use the shaped connectors of the sidewalls being pressed against the connectors of the cylinder heads on both sides by the pressure in the manifold; in which the air manifold has no external pipes along its length, and contains passages for the fluids that run essentially along its entire length, including further channels for instance for oil and/or water, not communicating directly with the cylinder heads and integrated into the air manifold; and in which, in the part adjacent to the rows of cylinders and directly under the air manifold, the engine crankcase itself contains passages for water, the upper one of which is sealed directly by the air manifold by the pressure in the manifold.

13. An engine according to claim 12, further comprising an intercooler for a turbocharger arrangement, mounted directly on top of the air manifold.

14. An engine according to any claim 12, in which the air manifold is cast of aluminum and has a generally rectangular cross-section.

\* \* \* \* \*